(12) United States Patent
Gast et al.

(10) Patent No.: US 10,091,065 B1
(45) Date of Patent: Oct. 2, 2018

(54) ZERO CONFIGURATION NETWORKING ON A SUBNETTED NETWORK

(75) Inventors: Matthew Stuart Gast, San Francisco, CA (US); Liang Wang, San Jose, CA (US); Yong Kang, Palo Alto, CA (US); Adam Michael Conway, San Jose, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

(21) Appl. No.: 13/286,121

(22) Filed: Oct. 31, 2011

(51) Int. Cl.
*G06F 15/16* (2006.01)
*H04L 12/24* (2006.01)
*H04L 29/06* (2006.01)
*H04L 29/08* (2006.01)

(52) U.S. Cl.
CPC .............. *H04L 41/12* (2013.01); *H04L 67/16* (2013.01); *H04L 69/24* (2013.01)

(58) Field of Classification Search
None
See application file for complete search history.

(56) References Cited

U.S. PATENT DOCUMENTS

| | | |
|---|---|---|
| 5,471,671 A | 11/1995 | Wang et al. |
| 5,697,059 A | 12/1997 | Carney |
| 5,726,984 A | 3/1998 | Kubler et al. |
| 5,956,643 A | 9/1999 | Benveniste |
| 6,061,799 A | 5/2000 | Eldridge et al. |
| 6,112,092 A | 8/2000 | Benveniste |
| 6,154,655 A | 11/2000 | Borst et al. |

(Continued)

FOREIGN PATENT DOCUMENTS

| | | |
|---|---|---|
| CN | 1642143 | 7/2005 |
| EP | 0940999 | 9/1999 |

(Continued)

OTHER PUBLICATIONS

Z2Z: Discovering ZeroConf Services Beyond Local Link by Jae Woo Lee et al. Departement of Computer Science, Columiba Univerisity New York City—Published in Globecom Workshops, 2007 IEEE Date of Conference Nov. 26-30, 2007.*

(Continued)

*Primary Examiner* — Younes Naji
(74) *Attorney, Agent, or Firm* — Sheppard, Mullin, Richter & Hampton LLP

(57) ABSTRACT

Methods and apparatus are described for implementing service discovery protocols on subnetted zero configuration networks. A process for managing service advertisement across a plurality of subnets may comprise: collecting service advertisements on a local network level by designated network devices; sending listings of services from each of the designated devices to a master network device; sending a table of services for the plurality of subnets from the master device to all of the designated devices on the plurality of subnets; creating by each of the designated network devices for the corresponding subnet a service discovery proxy table listing the service advertisements on the subnets of the plurality of subnets beyond the subnet corresponding to the designated device; and periodically transmitting by each of the designated devices on the corresponding subnets service advertisements for the services of the corresponding service discovery proxy table.

30 Claims, 9 Drawing Sheets

(56) References Cited

U.S. PATENT DOCUMENTS

| | | |
|---|---|---|
| 6,201,792 B1 | 3/2001 | Lahat |
| 6,233,222 B1 | 5/2001 | Wallentin |
| 6,314,294 B1 | 11/2001 | Benveniste |
| 6,473,413 B1 | 10/2002 | Chiou et al. |
| 6,496,699 B2 | 12/2002 | Benveniste |
| 6,519,461 B1 | 2/2003 | Andersson et al. |
| 6,628,623 B1 | 9/2003 | Noy |
| 6,628,938 B1 | 9/2003 | Rachabathuni et al. |
| 6,636,498 B1 | 10/2003 | Leung |
| 6,775,549 B2 | 8/2004 | Benveniste |
| 6,865,393 B1 | 3/2005 | Baum et al. |
| 6,957,067 B1 | 10/2005 | Iyer et al. |
| 7,002,943 B2 | 2/2006 | Bhagwat et al. |
| 7,057,566 B2 | 6/2006 | Theobold |
| 7,085,224 B1 | 8/2006 | Oran |
| 7,085,241 B1 | 8/2006 | O'Neill et al. |
| 7,130,629 B1 | 10/2006 | Leung et al. |
| 7,154,874 B2 | 12/2006 | Bhagwat et al. |
| 7,164,667 B2 | 1/2007 | Rayment et al. |
| 7,174,170 B2 | 2/2007 | Steer et al. |
| 7,177,646 B2 | 2/2007 | O'Neill et al. |
| 7,181,530 B1 | 2/2007 | Halasz et al. |
| 7,224,697 B2 | 3/2007 | Banerjea et al. |
| 7,216,365 B2 | 5/2007 | Bhagwat et al. |
| 7,251,238 B2 | 7/2007 | Joshi et al. |
| 7,336,670 B1 | 2/2008 | Calhoun |
| 7,339,914 B2 | 3/2008 | Bhagwat et al. |
| 7,346,338 B1 | 3/2008 | Calhoun et al. |
| 7,366,894 B1 | 4/2008 | Kalimuthu et al. |
| 7,369,489 B1 | 5/2008 | Bhattacharya |
| 7,370,362 B2 | 5/2008 | Olson et al. |
| 7,440,434 B2 | 10/2008 | Chaskar et al. |
| 7,512,379 B2 | 3/2009 | Nguyen |
| 7,536,723 B1 | 5/2009 | Bhagwat et al. |
| 7,562,384 B1 | 7/2009 | Huang |
| 7,593,356 B1 | 9/2009 | Friday et al. |
| 7,656,822 B1* | 2/2010 | AbdelAziz .......... H04L 12/4633 370/255 |
| 7,706,789 B2 | 4/2010 | Qi et al. |
| 7,716,370 B1* | 5/2010 | Devarapalli .......... G06F 15/16 709/208 |
| 7,751,393 B2 | 7/2010 | Chaskar et al. |
| 7,768,952 B2 | 8/2010 | Lee |
| 7,793,104 B2 | 9/2010 | Zheng et al. |
| 7,804,808 B2 | 9/2010 | Bhagwat et al. |
| 7,843,907 B1 | 11/2010 | Abou-Emara et al. |
| 7,844,057 B2 | 11/2010 | Meier et al. |
| 7,856,209 B1 | 12/2010 | Rawat |
| 7,921,185 B2* | 4/2011 | Chawla ............... H04L 67/1097 370/351 |
| 7,949,342 B2 | 5/2011 | Cuffaro et al. |
| 7,961,725 B2 | 6/2011 | Nagarajan et al. |
| 7,970,894 B1 | 6/2011 | Patwardhan |
| 8,000,308 B2 | 8/2011 | Dietrich et al. |
| 8,069,483 B1 | 11/2011 | Matlock |
| 8,219,688 B2* | 7/2012 | Wang ................... H04L 67/16 709/220 |
| 8,249,606 B1 | 8/2012 | Neophytou et al. |
| 8,493,918 B2 | 7/2013 | Karaoguz et al. |
| 8,789,191 B2 | 7/2014 | Bhagwat et al. |
| 8,824,448 B1 | 9/2014 | Narayana et al. |
| 8,948,046 B2 | 2/2015 | Kang et al. |
| 8,953,453 B1 | 2/2015 | Xiao |
| 9,003,527 B2 | 4/2015 | Bhagwat et al. |
| 2001/0006508 A1 | 7/2001 | Pankaj et al. |
| 2002/0012320 A1 | 1/2002 | Ogler et al. |
| 2002/0021689 A1 | 2/2002 | Robbins et al. |
| 2002/0041566 A1 | 4/2002 | Yang |
| 2002/0071422 A1 | 6/2002 | Amicangioli |
| 2002/0091813 A1 | 7/2002 | Lamberton et al. |
| 2002/0114303 A1 | 8/2002 | Crosbie |
| 2002/0116463 A1* | 8/2002 | Hart ................... H04L 12/585 709/206 |
| 2002/0128984 A1 | 9/2002 | Mehta et al. |
| 2003/0005100 A1* | 1/2003 | Barnard ............ H04L 29/12113 709/223 |
| 2003/0039212 A1 | 2/2003 | Lloyd et al. |
| 2003/0084104 A1 | 5/2003 | Salem |
| 2003/0087629 A1 | 5/2003 | Juitt |
| 2003/0104814 A1 | 6/2003 | Gwon et al. |
| 2003/0129988 A1 | 7/2003 | Lee et al. |
| 2003/0145091 A1 | 7/2003 | Peng et al. |
| 2003/0179742 A1 | 9/2003 | Ogier et al. |
| 2003/0198207 A1 | 10/2003 | Lee |
| 2004/0003285 A1 | 1/2004 | Whelan et al. |
| 2004/0013118 A1 | 1/2004 | Borella |
| 2004/0022222 A1 | 2/2004 | Clisham |
| 2004/0054774 A1 | 3/2004 | Barber et al. |
| 2004/0064467 A1 | 4/2004 | Kola et al. |
| 2004/0077341 A1 | 4/2004 | Chandranmenon et al. |
| 2004/0103282 A1 | 5/2004 | Meier et al. |
| 2004/0109466 A1 | 6/2004 | Van Ackere et al. |
| 2004/0162037 A1 | 8/2004 | Shpak |
| 2004/0185876 A1 | 9/2004 | Groenendaal et al. |
| 2004/0192312 A1 | 9/2004 | Li et al. |
| 2004/0196977 A1 | 10/2004 | Johnson et al. |
| 2004/0236939 A1 | 11/2004 | Watanabe et al. |
| 2004/0255028 A1 | 12/2004 | Chu et al. |
| 2005/0053003 A1 | 3/2005 | Cain et al. |
| 2005/0074015 A1 | 4/2005 | Chari et al. |
| 2005/0085235 A1 | 4/2005 | Park |
| 2005/0099983 A1 | 5/2005 | Nakamura et al. |
| 2005/0122946 A1* | 6/2005 | Won ................... H04L 29/12283 370/338 |
| 2005/0154774 A1 | 7/2005 | Giaffreda et al. |
| 2005/0207417 A1 | 9/2005 | Ogawa et al. |
| 2005/0259682 A1 | 11/2005 | Yosef et al. |
| 2005/0262266 A1 | 11/2005 | Wiberg et al. |
| 2005/0265288 A1 | 12/2005 | Liu et al. |
| 2005/0266848 A1 | 12/2005 | Kim |
| 2006/0010250 A1 | 1/2006 | Eisl et al. |
| 2006/0013179 A1 | 1/2006 | Yamane |
| 2006/0026289 A1 | 2/2006 | Lyndersay et al. |
| 2006/0062250 A1 | 3/2006 | Payne, III |
| 2006/0107050 A1 | 5/2006 | Shih |
| 2006/0117018 A1* | 6/2006 | Christiansen ....... G06F 12/0866 |
| 2006/0140123 A1 | 6/2006 | Conner et al. |
| 2006/0146748 A1 | 7/2006 | Ng et al. |
| 2006/0146846 A1 | 7/2006 | Yarvis et al. |
| 2006/0165015 A1 | 7/2006 | Melick et al. |
| 2006/0187949 A1 | 8/2006 | Seshan et al. |
| 2006/0221920 A1 | 10/2006 | Gopalakrishnan et al. |
| 2006/0233128 A1 | 10/2006 | Sood et al. |
| 2006/0234701 A1 | 10/2006 | Wang et al. |
| 2006/0245442 A1 | 11/2006 | Srikrishna et al. |
| 2006/0251256 A1 | 11/2006 | Asokan et al. |
| 2006/0268802 A1 | 11/2006 | Faccin |
| 2006/0294246 A1 | 12/2006 | Stieglitz et al. |
| 2007/0004394 A1 | 1/2007 | Chu et al. |
| 2007/0010231 A1 | 1/2007 | Du |
| 2007/0025274 A1 | 2/2007 | Rahman et al. |
| 2007/0025298 A1 | 2/2007 | Jung |
| 2007/0049323 A1 | 3/2007 | Wang et al. |
| 2007/0077937 A1 | 4/2007 | Ramakrishnan et al. |
| 2007/0078663 A1 | 4/2007 | Grace |
| 2007/0082656 A1 | 4/2007 | Stieglitz et al. |
| 2007/0087756 A1 | 4/2007 | Hoffberg |
| 2007/0091859 A1 | 4/2007 | Sethi et al. |
| 2007/0115847 A1 | 5/2007 | Strutt et al. |
| 2007/0116011 A1 | 5/2007 | Lim et al. |
| 2007/0121947 A1 | 5/2007 | Sood et al. |
| 2007/0133407 A1 | 6/2007 | Choi et al. |
| 2007/0140191 A1 | 6/2007 | Kojima |
| 2007/0150720 A1 | 6/2007 | Oh et al. |
| 2007/0153697 A1 | 7/2007 | Kwan |
| 2007/0153741 A1 | 7/2007 | Blanchette et al. |
| 2007/0156804 A1 | 7/2007 | Mo |
| 2007/0160017 A1 | 7/2007 | Meier et al. |
| 2007/0171885 A1 | 7/2007 | Bhagwat et al. |
| 2007/0192862 A1 | 8/2007 | Vermeulen et al. |
| 2007/0195761 A1 | 8/2007 | Tatar et al. |
| 2007/0247303 A1 | 10/2007 | Payton |
| 2007/0248014 A1 | 10/2007 | Xie |

(56) References Cited

U.S. PATENT DOCUMENTS

| | | |
|---|---|---|
| 2007/0249324 A1 | 10/2007 | Jou et al. |
| 2007/0263532 A1 | 11/2007 | Mirtorabi et al. |
| 2007/0280481 A1 | 12/2007 | Eastlake et al. |
| 2007/0288997 A1 | 12/2007 | Meier et al. |
| 2008/0002642 A1 | 1/2008 | Borkar et al. |
| 2008/0022392 A1 | 1/2008 | Karpati et al. |
| 2008/0037552 A1 | 2/2008 | Dos Remedios et al. |
| 2008/0080369 A1 | 4/2008 | Sumioka |
| 2008/0080377 A1 | 4/2008 | Sasaki et al. |
| 2008/0090575 A1 | 4/2008 | Barak et al. |
| 2008/0095094 A1 | 4/2008 | Innami |
| 2008/0095163 A1 | 4/2008 | Chen et al. |
| 2008/0107027 A1 | 5/2008 | Allan et al. |
| 2008/0109879 A1 | 5/2008 | Bhagwat et al. |
| 2008/0130495 A1 | 6/2008 | Dos Remedios et al. |
| 2008/0146240 A1 | 6/2008 | Trudeau |
| 2008/0151751 A1 | 6/2008 | Ponnuswamy et al. |
| 2008/0159128 A1 | 7/2008 | Shaffer |
| 2008/0159135 A1 | 7/2008 | Caram |
| 2008/0170527 A1 | 7/2008 | Lundsgaard et al. |
| 2008/0186932 A1 | 8/2008 | Do et al. |
| 2008/0194271 A1 | 8/2008 | Bedekar et al. |
| 2008/0207215 A1 | 8/2008 | Chu et al. |
| 2008/0209186 A1 | 8/2008 | Boden |
| 2008/0212562 A1 | 9/2008 | Bedekar et al. |
| 2008/0219286 A1 | 9/2008 | Ji et al. |
| 2008/0225857 A1 | 9/2008 | Lange |
| 2008/0229095 A1 | 9/2008 | Kalimuthu et al. |
| 2008/0240128 A1 | 10/2008 | Elrod |
| 2008/0253370 A1 | 10/2008 | Cremin et al. |
| 2008/0273520 A1 | 11/2008 | Kim et al. |
| 2008/0279161 A1* | 11/2008 | Stirbu ............... H04W 8/18 370/338 |
| 2009/0019521 A1 | 1/2009 | Vasudevan |
| 2009/0028052 A1 | 1/2009 | Strater et al. |
| 2009/0040989 A1 | 2/2009 | da Costa et al. |
| 2009/0043901 A1 | 2/2009 | Mizikovsky et al. |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0113018 A1 | 4/2009 | Thomson et al. |
| 2009/0141692 A1* | 6/2009 | Kasslin ............. H04W 48/16 370/338 |
| 2009/0144740 A1 | 6/2009 | Gao |
| 2009/0168645 A1 | 7/2009 | Tester et al. |
| 2009/0172151 A1 | 7/2009 | Davis |
| 2009/0197597 A1 | 8/2009 | Kotecha |
| 2009/0207806 A1 | 8/2009 | Makela et al. |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2009/0303883 A1 | 12/2009 | Kucharczyk et al. |
| 2009/0310557 A1 | 12/2009 | Shinozaki |
| 2010/0020753 A1 | 1/2010 | Fulknier |
| 2010/0046368 A1 | 2/2010 | Kaempfer et al. |
| 2010/0057930 A1* | 3/2010 | DeHaan ............... G06F 8/61 709/232 |
| 2010/0061234 A1 | 3/2010 | Pai |
| 2010/0067379 A1 | 3/2010 | Zhao et al. |
| 2010/0112540 A1 | 5/2010 | Gross et al. |
| 2010/0115278 A1 | 5/2010 | Shen et al. |
| 2010/0115576 A1 | 5/2010 | Hale et al. |
| 2010/0132040 A1 | 5/2010 | Bhagwat et al. |
| 2010/0195585 A1 | 8/2010 | Horn |
| 2010/0208614 A1 | 8/2010 | Harmatos |
| 2010/0228843 A1 | 9/2010 | Ok et al. |
| 2010/0240313 A1 | 9/2010 | Kawai |
| 2010/0254316 A1 | 10/2010 | Sendrowicz |
| 2010/0260091 A1 | 10/2010 | Seok |
| 2010/0290397 A1 | 11/2010 | Narayana et al. |
| 2010/0304738 A1 | 12/2010 | Lim et al. |
| 2010/0311420 A1 | 12/2010 | Reza et al. |
| 2010/0322217 A1 | 12/2010 | Jin et al. |
| 2010/0325720 A1 | 12/2010 | Etchegoyen |
| 2011/0004913 A1 | 1/2011 | Nagarajan et al. |
| 2011/0040867 A1 | 2/2011 | Kalbag |
| 2011/0051677 A1 | 3/2011 | Jetcheva et al. |
| 2011/0055326 A1* | 3/2011 | Michaelis ............. H04W 48/08 709/204 |
| 2011/0055928 A1 | 3/2011 | Brindza |
| 2011/0058524 A1 | 3/2011 | Hart et al. |
| 2011/0064065 A1 | 3/2011 | Nakajima et al. |
| 2011/0085464 A1 | 4/2011 | Nordmark et al. |
| 2011/0182225 A1 | 7/2011 | Song et al. |
| 2011/0185231 A1* | 7/2011 | Balestrieri .......... G06F 11/3672 714/27 |
| 2011/0258641 A1 | 10/2011 | Armstrong et al. |
| 2011/0292897 A1 | 12/2011 | Wu et al. |
| 2012/0014386 A1* | 1/2012 | Xiong ............... H04L 29/12028 370/392 |
| 2012/0290650 A1* | 11/2012 | Montuno ................ H04W 4/80 709/204 |
| 2013/0003729 A1 | 1/2013 | Raman et al. |
| 2013/0003739 A1 | 1/2013 | Raman et al. |
| 2013/0003747 A1 | 1/2013 | Raman et al. |
| 2013/0028158 A1* | 1/2013 | Lee .................... H04W 52/0206 370/311 |
| 2013/0059570 A1 | 3/2013 | Hara et al. |
| 2013/0086403 A1 | 4/2013 | Jenne et al. |
| 2013/0103833 A1 | 4/2013 | Ringland et al. |
| 2013/0227306 A1 | 8/2013 | Santos et al. |
| 2013/0230020 A1 | 9/2013 | Backes |
| 2013/0250811 A1 | 9/2013 | Vasseur et al. |
| 2014/0269327 A1 | 9/2014 | Fulknier et al. |
| 2014/0298467 A1 | 10/2014 | Bhagwat et al. |
| 2015/0120864 A1 | 4/2015 | Unnimadhavan et al. |

FOREIGN PATENT DOCUMENTS

| | | |
|---|---|---|
| EP | 1732276 | 12/2006 |
| EP | 1771026 | 4/2007 |
| EP | 1490773 | 1/2013 |
| WO | 0059251 | 10/2000 |
| WO | 0179992 | 10/2001 |
| WO | 2004042971 | 5/2004 |
| WO | 2006129287 | 12/2006 |
| WO | 2009141016 | 11/2009 |

OTHER PUBLICATIONS

International Application No. PCT/US2012/059093, International Search Report and Written Opinion dated Jan. 4, 2013.

Clausen, T., et al., Optimized Link State Routing Protocol (OLSR), Network Working Group, Oct. 2003, pp. 1-71.

Perkins, C., et al., Ad hoc On-Demand Distance Vector (AODV) Routing, Network Working Group, Oct. 2003, pp. 1-35.

International Application No. PCT/US2011/047591, International Search Report and Written Opinion dated Dec. 19, 2011.

International Application No. PCT/US2008/061674, International Search Report and Written Opinion dated Oct. 14, 2008.

He, Changhua et al., "Analysis of the 802.11i 4-Way Handshake," Proceedings of the 3rd ACM Workshop on Wireless Security, pp. 43-50, Oct. 2004.

Chirumamilla, Mohan K. et al., "Agent Based Intrustion Detection and Response System for Wireless LANs," CSE Conference and Workshop Papers, Paper 64, Jan. 1, 2003.

Craiger, J. Philip, "802.11, 802.1x, and Wireless Security," SANS Institute InfoSec Reading Room, Jun. 23, 2002.

Finlayson, Ross et al., "A Reverse Address Resolution Protocol," Nework Working Group, Request for Comments: 903 (RFC 903), Jun. 1984.

Wu, Haitao et al., "Layer 2.5 SoftMAC: End-System Based Media Streaming Support on Home Networks," IEEE Global Telecommunications Conference (GLOBECOM '05), vol. 1, pp. 235-239, Nov. 2005.

European Patent Application No. 12879114.2, Search Report dated Jan. 21, 2016.

European Patent Application No. 11823931.8, Search Report dated Aug. 29, 2016.

(56) References Cited

OTHER PUBLICATIONS

IEEE Computer Society, "IEEE Std 802.11i—Part 11: Wireless LAN Medium Access Control (MAC) and Physical Layer (PHY) Specifications—Amendment 6: Medium Access Control (MAC) Security Enhancements," Section H.4.1, pp. 165-166, Jul. 23, 2014.

\* cited by examiner

ZERO CONFIGURATION NETWORKING ON A SUBNETTED NETWORK

BACKGROUND

Field of the Invention

The present invention relates generally to zero configuration networking and more specifically to methods and apparatus for implementing service discovery protocols on subnetted zero configuration networks.

Description of the Related Art

A zero configuration network is an IP network that is configured without the need for any manual configuration or special configuration servers. For example, someone without networking expertise can readily connect computers, printers and other devices, which are then automatically networked. This automatic networking function may: allocate IP addresses for the devices, if required, translate between domain names and IP addresses, and locate network services. A comprehensive description of zero configuration networking is provided in *Zero Configuration Networking: The Definitive Guide*, Stuart Cheshire and Daniel H. Steinberg, O'Reilly Media, Inc., Sebastopol, C A 2006.

Service discovery protocols are used on zero configuration networks to automatically detect services available on connected network devices and to advertise the detected services. Examples of service discovery protocols used on zero configuration networks include Bonjour available from Apple, Inc. and Avahi, for example. Universal Plug and Play (UPnP) may also be used for service discovery on zero configuration networks.

These service discovery protocols provide automatic service discovery within a transmission domain. Thus, when the population of devices on a network becomes high and networks are segmented into multiple domains, users will have more limited service discovery. This may not be an issue where network switches or switching hubs connect multiple network segments to form a single L2 network allowing transmission of L3 link local multicasts across the entire network. However, as explained in more detail below, a network with a subnetted configuration does not permit L3 link local multicasts from one subnet to another without configuring DNS—a non-trivial challenge for the network administrator.

FIGS. 1-3 provide an illustration of some of the current challenges of service discovery across multiple subnets. FIG. 1 shows a multi-subnet configuration comprising two VLANs connected by an L3 switch or routing switch. Each VLAN is shown with an access point—AP1 and AP2. In this example of a school environment, VLAN 1 is dedicated to students, the students accessing the network at AP1, and VLAN 2 is dedicated to faculty, the faculty accessing the network at AP2. There is a printer on VLAN 2, for which a mDNS advertisement of a printing service appears on the local network, VLAN 2. The L3 switch blocks mDNS advertisements; consequently, the advertisement will not reach the student network, VLAN 1. However, in some circumstances it may be desirable for the students on VLAN 1 to be able to see the advertisement for the printing service on VLAN 2. This can be achieved if the L3 switch allows for forwarding or duplication of mDNS advertisements, the printing service will be advertised on both VLAN 1 and VLAN 2, as shown in FIG. 2, and the students can now see the advertisement of the printing service. However, the faculty would be able to see services advertised by student computers, such as_game._tcp perhaps, which may not be desirable. See FIG. 3. In fact, the students and faculty will be able to see all services available on both VLAN 1 and VLAN 2. Clearly, there is a need for an efficient process of selectively limiting the network-wide visibility of certain services, and also to limit the total number of services advertised in order for the transmission of advertisements to be manageable and useful to network users.

Furthermore, all the services on all subnets in a multi-subnet network may be an extremely large set of services and may be unmanageable to transmit to all network users. There is a need for processes to manage the volume of services being advertised within any one subnet.

SUMMARY OF THE INVENTION

The present invention includes methods and apparatus for implementing service discovery protocols on subnetted zero configuration networks. In general, embodiments of the invention are based on the concept of using designated network devices, such as APs, at the local, subnet level to collect and filter service advertisements (services advertised using a mDNS service advertisement protocol, for example), send the filtered service advertisements to a higher level designated network device for creation of a list of services available across a multiplicity of subnets, and then send the list to the local level designated network devices to allow for proxy service advertisements (proxy advertisements are permitted in mDNS service advertisement protocol) from across the multiplicity of subnets to be transmitted on all subnets.

According to aspects of the present invention a process for managing service advertisement across a plurality of subnets may comprise: collecting service advertisements on a local network level by designated network devices; sending listings of services from each of the designated devices to a master network device; sending a table of services for the plurality of subnets from the master device to all of the designated devices on the plurality of subnets; creating by each of the designated network devices for the corresponding subnet a service discovery proxy table listing the service advertisements on the subnets of the plurality of subnets beyond the subnet corresponding to the designated device; and periodically transmitting by each of the designated devices on the corresponding subnets service advertisements for the services of the corresponding service discovery proxy table. Furthermore, the process may comprise sending listings of services from each of the designated network devices to a designated back-up master network device and providing the filtered listings to the designated back-up master network device for creating said table of services. Furthermore, the process may comprise filtering the advertisements by the designated devices to provide filtered listings of services, the filtered listings being provided to the designated master network device for creating the table of services, wherein the filtering may use filtering rules based on regular expressions. Furthermore, the service advertisements and the proxy service advertisements may use multicast DNS (mDNS) protocol.

According to further aspects of the present invention, a system for managing service advertisement across a plurality of subnets may comprise: (1) a designated master network device including (a) a first memory device, a first computer program being stored in the first memory device, and (b) a first processor; and (2) a multiplicity of designated network devices, each of the multiplicity of designated network devices including (a) a second memory device, a second computer program being stored in the second memory device, and (b) a second processor, the second computer program causing the second processor to perform: (i) collecting service advertisements on a local network level; (ii) sending a listing of services to the designated master network device; (iii) receiving a table of service advertisements from the master network device, wherein the table is a combination of the listings for the plurality of subnets; (iv) creating a service discovery proxy table listing the service advertisements on the subnets of the plurality of subnets beyond the subnet corresponding to the designated network device; and (v) periodically transmitting service advertisements for the services of the service discovery proxy table on the subnet corresponding to the designated network device. Furthermore, the first computer program may cause the first processor to perform: on receiving listings of services from the multiplicity of designated network devices, combining the listings for the plurality of subnets to form the table of service advertisements; and sending the table to the multiplicity of designated network devices on the plurality of subnets. Furthermore, the plurality of subnets may be a plurality of LANs or VLANs, and preferably each VLAN is a single IP subnet. Furthermore, the designated network devices may be access points (APs), wireless APs, routers, switches or special software running on severs or virtual machines.

BRIEF DESCRIPTION OF THE FIGURES

These and other aspects and features of the present invention will become apparent to those ordinarily skilled in the art upon review of the following description of specific embodiments of the invention in conjunction with the accompanying figures, wherein.

DETAILED DESCRIPTION

Figure 1:
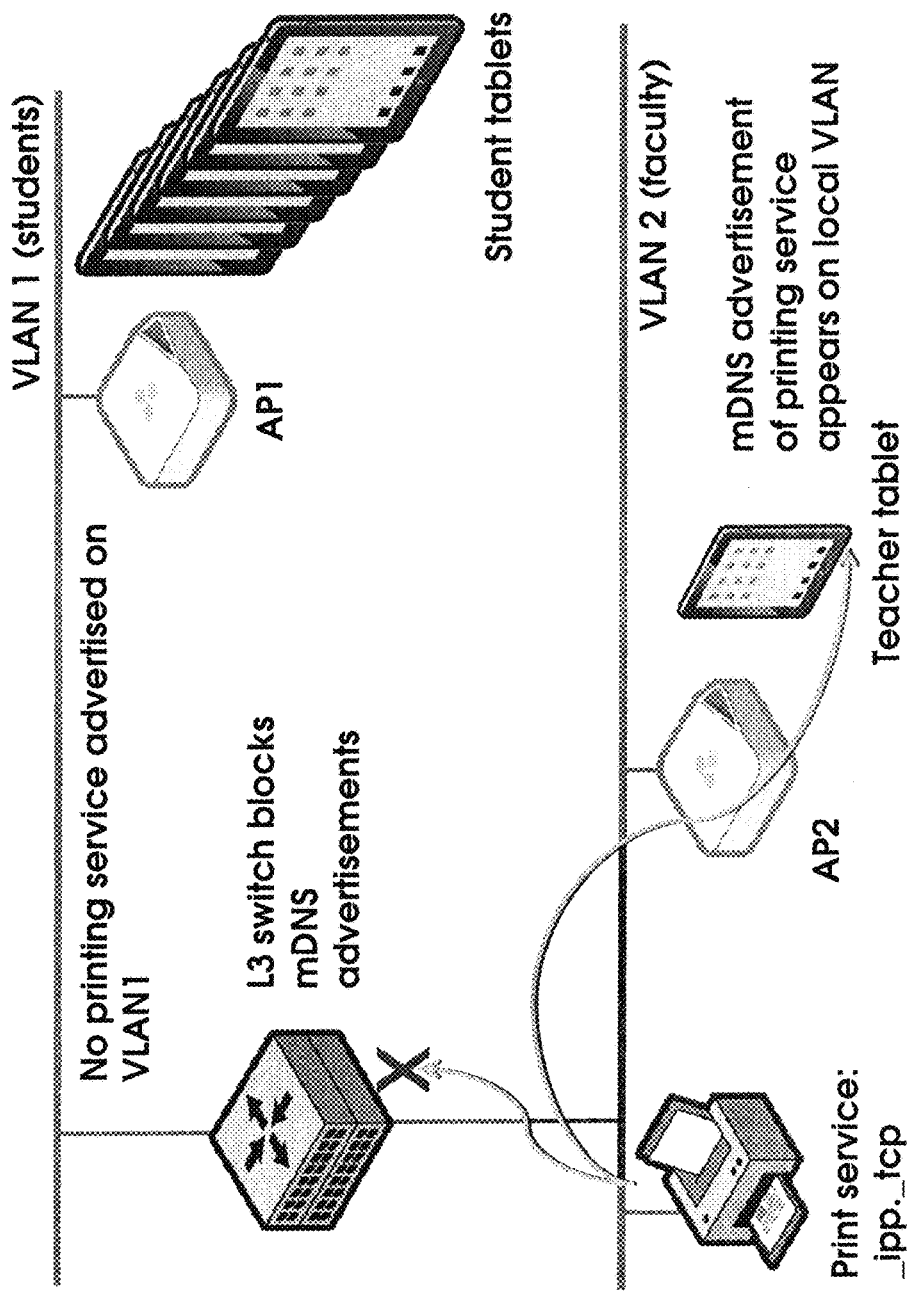
FIGS. 1-3 illustrate service advertisement processes over a multi-subnet network.

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, embodiments of the invention are based on the concept of using designated network devices, such as APs, at the local, subnet level to collect and filter service advertisements (services advertised using a mDNS service advertisement protocol, for example), send the filtered service advertisements to a higher level designated network device for creation of a list of services available across a multiplicity of subnets, and then send the list to the local level designated network devices to allow for proxy service advertisements (proxy advertisements are permitted in mDNS service advertisement protocol) from across the multiplicity of subnets to be transmitted on all subnets. Detailed examples are provided of the present invention for service advertisement protocols using mDNS, such as Bonjour. However, the concepts and teaching of the present invention, as stated above, are not limited to implementation with Bonjour. For example, embodiments of the invention may be implemented with service advertisement protocols such as UPnP. Furthermore, the concepts and teaching of the present invention may be implemented with NetBIOS Name Service.

A process for managing service advertisement across a plurality of subnets according to some embodiments of the present invention may include the following steps: collecting service advertisements on the local network level by designated network devices and creating link-level tables of the available services for each subnet with a designated network device (note that not all subnets will necessarily have a designated network device, since a designated device is only needed on subnets with services for which service advertisements are desired to be transmitted across the plurality of subnets); filtering the local service advertisements in the tables by the designated network devices to provide filtered listings of services; sending the filtered listings from each designated network device to a designated master network device (and preferably to a designated back-up master network device) and combining the filtered listings at the designated master network device to form a table of filtered service advertisements; and sending the table of filtered service advertisements to all designated network devices, such that each designated network device maintains a service discovery proxy table listing the filtered services on the plurality of subnets. This process is explained in more detail with reference to FIGS. 4-8.

Figure 4:
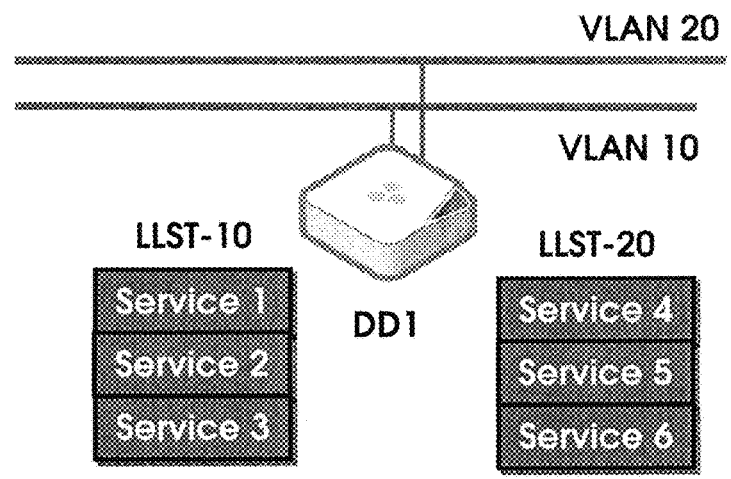
FIG. 4 illustrates local level collection of service advertisements by a network device, according to some embodiments of the invention.

In FIG. 4, a designated network device (DD1) is shown collecting service advertisements on the local network level for both VLAN 10 and VLAN 20. These local level service advertisements are provided by a service advertisement protocol such as Bonjour using mDNS. DD1 creates link-level service tables (LLST)—LLST-10 and LLST-20, for the subnets VLAN 10 and VLAN 20, respectively. LLST-10 and LLST-20 are stored in memory on DD1. In this example, LLST-10 lists services 1-3 which are advertised on VLAN 10 and LLST-20 lists services 4-6 which are advertised on VLAN 20. FIG. 4 represents part of a larger network which includes a plurality of subnets—VLAN 10, VLAN 20 . . . VLAN 50, as illustrated in FIG. 5.

Figure 5:
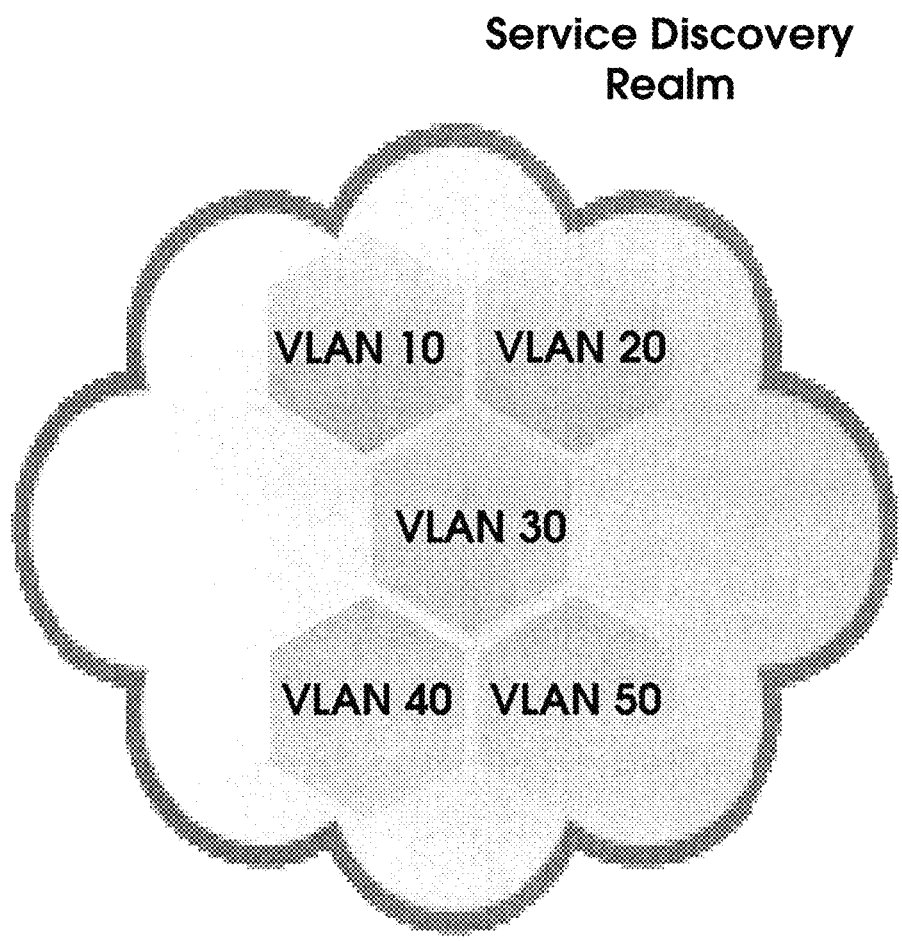
FIG. 5 shows five VLANs combined to form a service discovery realm, according to some embodiments of the invention.

The five subnets in FIG. 5 are referred to herein as a service discovery realm. The term realm is used so as to be clear that the grouping of subnets need not in all cases correspond to a complete network—in other words there may be more than one realm within a network. The number of subnets within a realm may be within the range of 2 to tens of thousands or more. On a practical level a limitation to the number of subnets may be determined by the memory and processing requirements in the designated devices required for the service advertisements not in a designated device's subnet. The subnets may be local area networks (LANs) or virtual LANs (VLANs), and preferably each VLAN is a single IP subnet. A realm may correspond to a geographical region, such as one building on a company campus, or to an organizational division, such as an engineering group, where sharing advertised services is beneficial. A realm corresponding to a geographical region is beneficial when services such as printing are being advertised—a user is unlikely to be interested in a printing service across the other side of a large company campus and will only want to see those in close geographical proximity, and thus a realm of limited geographical extent is beneficial. A realm corresponding to a particular organizational division may be beneficial if the division is spread out geographically but wishes to share software tools, datafiles, presentations, etc.

To provide a specific example of a realm, consider Kindergarten through $12^{th}$ grade school districts. The realm is likely to be either a single school building, or the entire district. Where districts are reasonably small—for a small city—the district may be a realm. Where the district is county-wide, and may have almost 10,000 APs, there may be multiple realms—these realms may be either a particular slice of the district (elementary/middle/high schools in three realms) or individual schools.

These service discovery realms may be user defined or may be determined automatically. An example of the latter is a large set of cooperative control APs which cover a continuous area which automatically organize into coverage sub-areas, where each sub-area is a realm. A further example is a network for a company with three locations worldwide and the APs self-organize into realms that form continuous coverage areas, in this case three realms—one for each location. When wireless APs are used, the wireless coverage areas of adjacent APs within a realm will often be spatially overlapping.

A designated network device, DD, is needed for each subnet in a realm. The number of designated devices may correspond to the number of subnets in a realm, or, as shown in FIG. 4, multiple subnets may share a common designated device. There may also be a second DD for each subnet which acts as a back-up. Lower level designated devices may be network devices such as access points (APs), a specific example being the cooperative control AP—the HiveAP device—available from Aerohive Networks, Inc. Furthermore, designated devices may be routers, switches and even special software running on servers or virtual machines. The realm level designated devices may also by APs, or may be controllers in networks that have centralized control. Furthermore, the realm level designated devices may be any of the network devices described above for lower level designated devices. A network device, such as an AP, may double as both a lower level and a realm level designated device. Where there are many suitable network devices on a subnet an election process may be used to designate one device and a back-up. For example, the first AP coming up on a VLAN is the DD, and the second the back-up, or the device with the lowest MAC address is the DD and the next lowest is the back-up. Similarly, for each realm a master realm device and a back-up device are designated. In one embodiment, the set of lower level designated devices elect one of the set to be realm master and a second to be back-up realm master. Two realm level devices are preferred to provide for seamless backup when the master dies. Having two realm level devices also reduces the $O(N^{\wedge}2)$ problem of synchronizing between subnets to O(N). (If you have N devices, you need to have N*(N−1) connections between all of them in a full mesh, but if you have designated devices acting as master and backup master, you only need 2N connections—the load on the network is reduced.)

To share information between designated devices, a communication protocol built on top of the Internet Protocol (IP) can be used. The communication carries a list of services to be shared along with the network address for each service. By building the communication protocol between designated devices on IP, it can span any physical distance covered by an IP network and traverse a network built out of nearly any networking component available for sale today.

Figure 6:
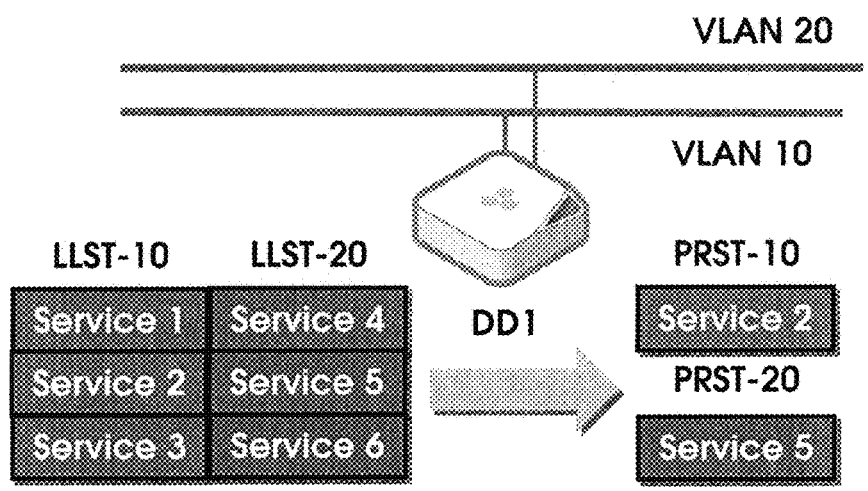
FIG. 6 illustrates filtering of local level service advertisements by a network device, according to some embodiments of the invention.

In FIG. 6, the designated device DD1 is shown filtering the local service advertisements on LLST-10 and LLST-20 to provide corresponding lists of filtered services for each subnet—partial realm service tables PRST-10 and PRST-20. The filtering is executed by a processor on DD1 and the partial realm service tables are stored in memory on DD1. (The tables are preferably also stored in memory on a back-up designated device. The tables may also be stored on disk.) Filter rules may be consistent throughout a realm or may be custom for each subnet within a realm. An example of a filter rule for (1) a realm corresponding to a single building on a campus is to allow all printing services to be advertised providing the building is not too large, and (2) a realm including geographically disparate locations is to exclude all printing services, thus only printing services on a local level will be advertised. Filters may be used to restrict access to certain services by not advertising them beyond their local network. In the example in FIG. 6, the filter removes services 1 and 3 from LLST-10 and services 4 and 6 from LLST-20, thus service 2 is included in PRST-10 and service 4 is included in PRST-20. The designated device DD1 then sends the partial realm service tables to a master realm designated device (MRDD).

Filtering rules may be based on regular expressions. For example: match "_ipp._tcp" exactly will match exactly one service—the IPP (Internet Printing Protocol); match "_i*_.tcp" will match any TCP service that begins with the letter I, and thus will match IPP as above, but it will also match "_ipodconfiguration._tcp"; or match "*._tcp" will match any TCP service.

Figure 7:
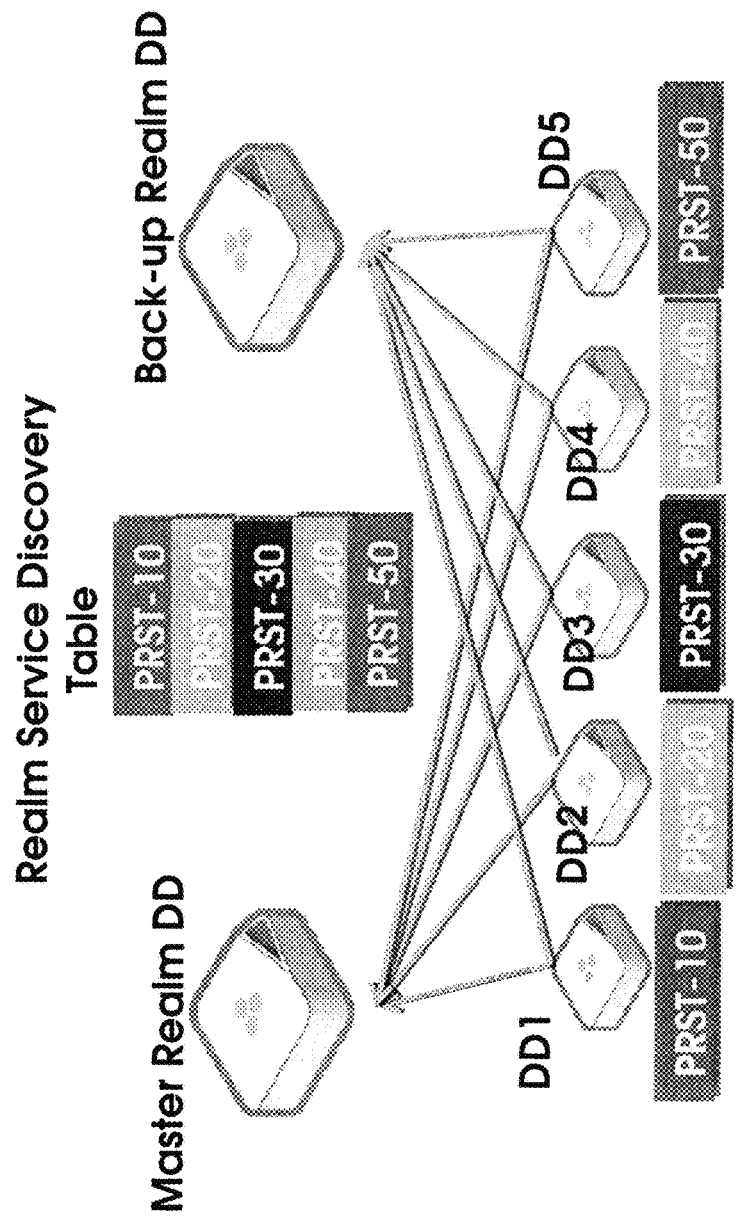
FIG. 7 illustrates local level designated network devices sending the filtered local level service advertisements to a realm level designated network device and a realm level back-up device, where a consolidated table of filtered service advertisements for the entire realm is created, according to some embodiments of the invention.

In FIG. 7, the designated devices DD1, DD2, . . . DD5 are all shown sending partial realm service tables to the master realm DD and the back-up realm DD, where they are stored in memory. The realm level DDs separately combine the PRSTs to create a realm service discovery table (RSDT) which is stored in memory. (The tables—PRSTs and RSDT—are preferably also stored in memory on a back-up master designated device. The tables may also be stored on disk.) The master realm DD then sends the RSDT to each DD for each subnet—the RSTD is stored in memory on each designated device. (The tables are preferably also stored in memory on a back-up designated device. The tables may also be stored on disk.) Note that in FIG. 7 separate designated devices DD1 and DD2 are shown for VLAN 10 and VLAN 20, although in alternative configurations VLAN 10 and VLAN 20 may have a common designated device, as shown in FIG. 4. Furthermore, a single designated devices may be used if it can be plugged into a trunk port that is connected to all VLANs, in which case it receives all service advertisements, and can maintain the entire network state table without having to synchronize between devices.

The back-up master designated device may be triggered into action on receipt of a message that the designated master network device is not communicating with the designated network devices or by being unable to communicate with the master device over several seconds, in which case the designated back-up master network device sends the realm service discovery table to the designated network devices on the plurality of subnets in the realm.

Figure 8:
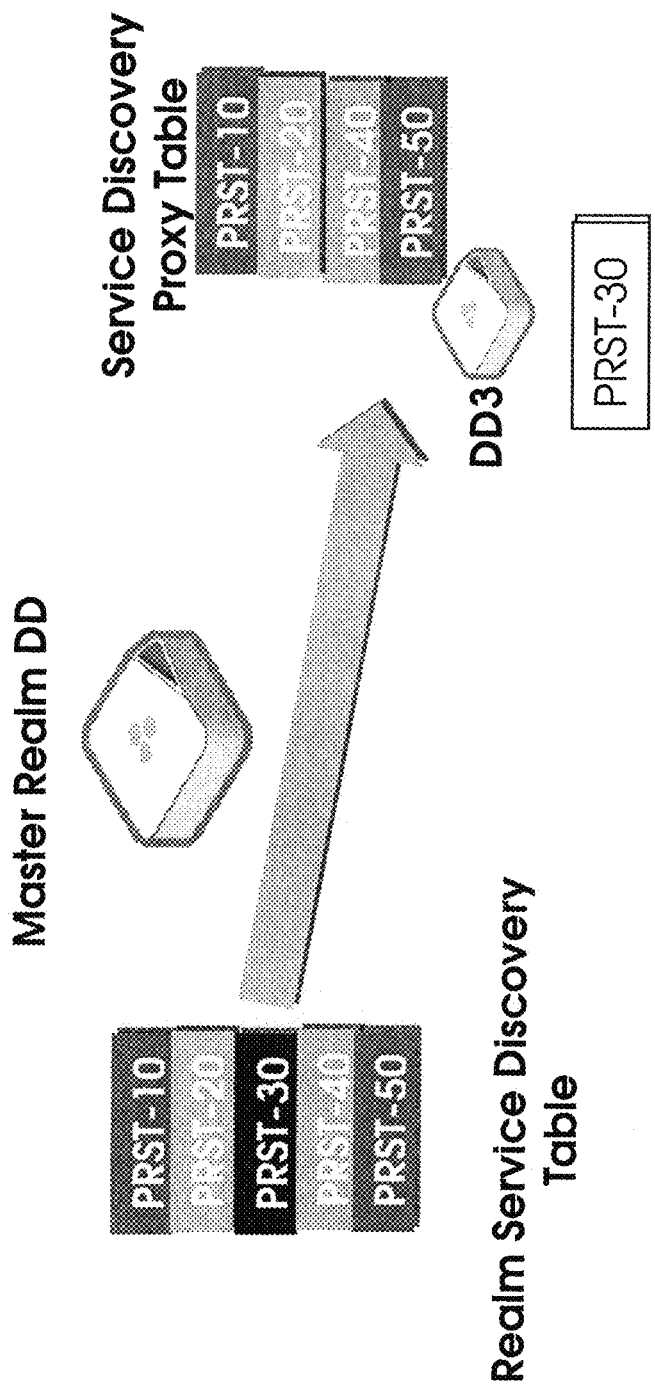
FIG. 8 illustrates sending of the realm level table of service advertisements to one of the local level designated devices, the local level device then creating a proxy table of realm level service advertisements for transmitting on the local subnet, according to some embodiments of the invention.
Figure 9:
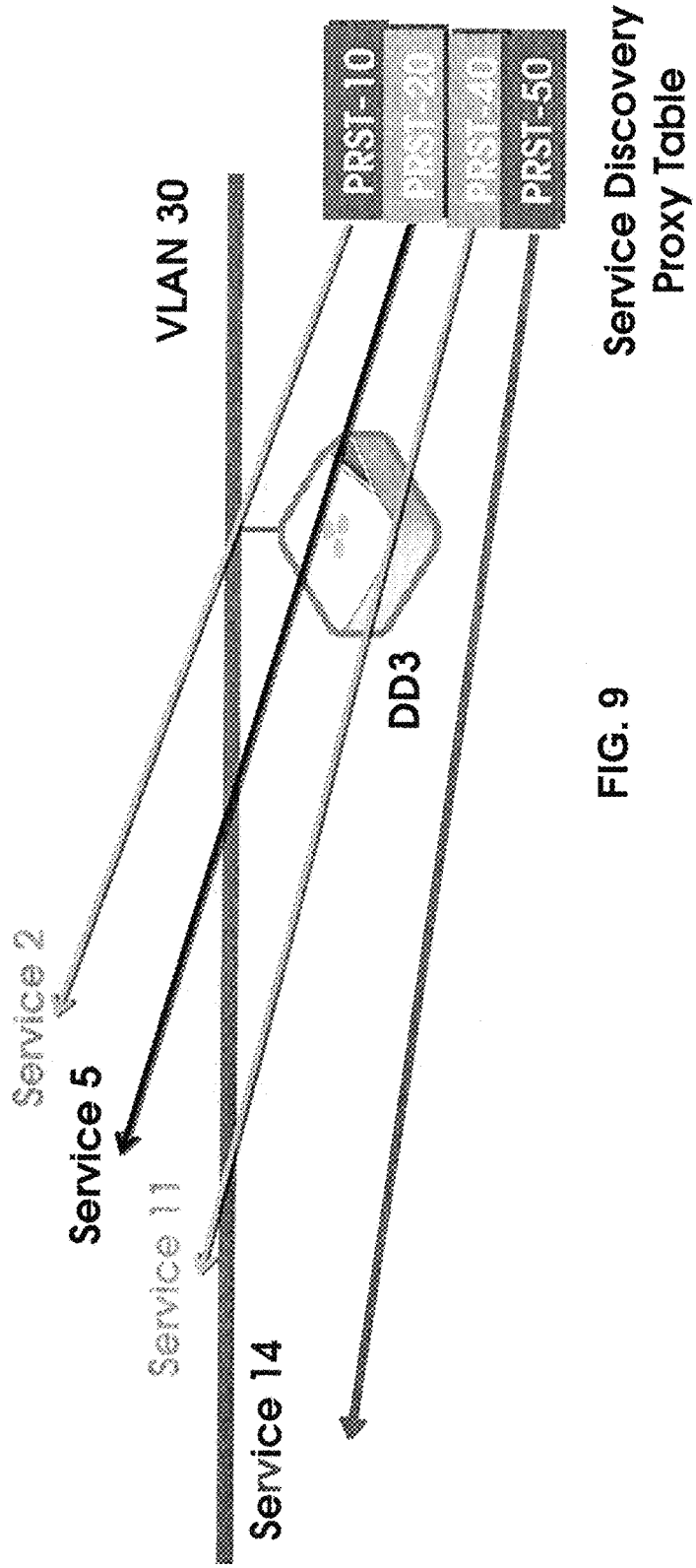
FIG. 9 illustrates transmitting over the local subnet of the proxy table of realm level service advertisements, according to some embodiments of the invention.

In FIG. 8, the master realm DD is shown sending the RSDT to DD1—the same designated device that collected and filtered the local level advertisements on the subnet. DD1 then creates a service discovery proxy table which includes the services available realm-wide, excluding those available on the local subnet. The service discovery proxy table is stored in memory on DD3. For example, DD3 creates a proxy table including the services available on VLAN 10, VLAN 20, VLAN 40 and VLAN 50, excluding the services available locally on VLAN 30. As shown in FIG. 9, DD3 then transmits the service discovery proxy table to its local subnet—VLAN 30. This transmitting may be efficiently executed by periodically transmitting mDNS messages on VLAN 30 to advertise all services in the proxy table. In FIG. 9, DD3 is shown advertising on VLAN 30 services 2, 5, 11 and 14 which are available on VLAN 10, VLAN 20, VLAN 40 and VLAN 50, respectively. Note that the RSDT received by the DD which covers the DD's subnet is used for comparison to assist in determining when a new service needs to be reported to the master realm DD for adding to the RSDT or when an old service is no longer being advertised and needs to be reported to the master realm DD for removal from the RSDT. Typically it is desired that RSDTs are republished with all updates approximately every 5 seconds. For example, when a new service is added to a subnet, the service advertisement would be identified as new by comparison with the subnet's RSDT, if it passes the filter information is then sent to the realm master designated device identifying the addition of a new service. From the realm master designated device the service advertisement is sent out to all designated devices on all subnets in the realm and proxy advertised on these subnets. It is desirable to have this updating process completed within approximately 5 seconds. Note that on the subnet of the new service, the service creator continues sending a service advertisement every couple of seconds for this new service; however, it is not this repeating service advertisement that is propagated to the realm level, merely the information that the service needs to be added or removed from the RSDT. Consequently, the process of the present invention produces a lesser load on routers compared to networks in which the routers allow forwarding or duplicating of mDNS advertisements, as described above with reference to FIG. 2.

Figure 2:
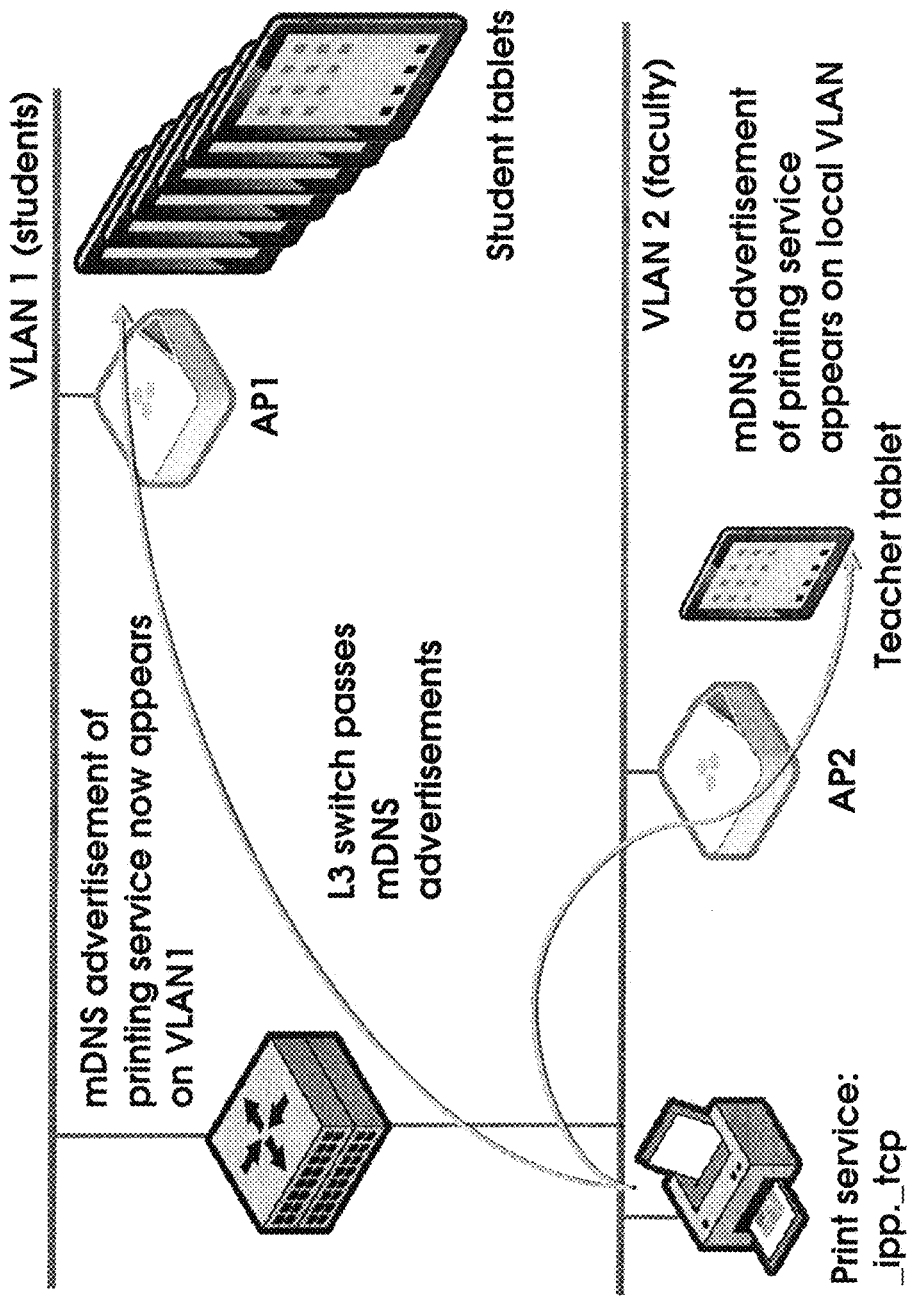
Figure 3:
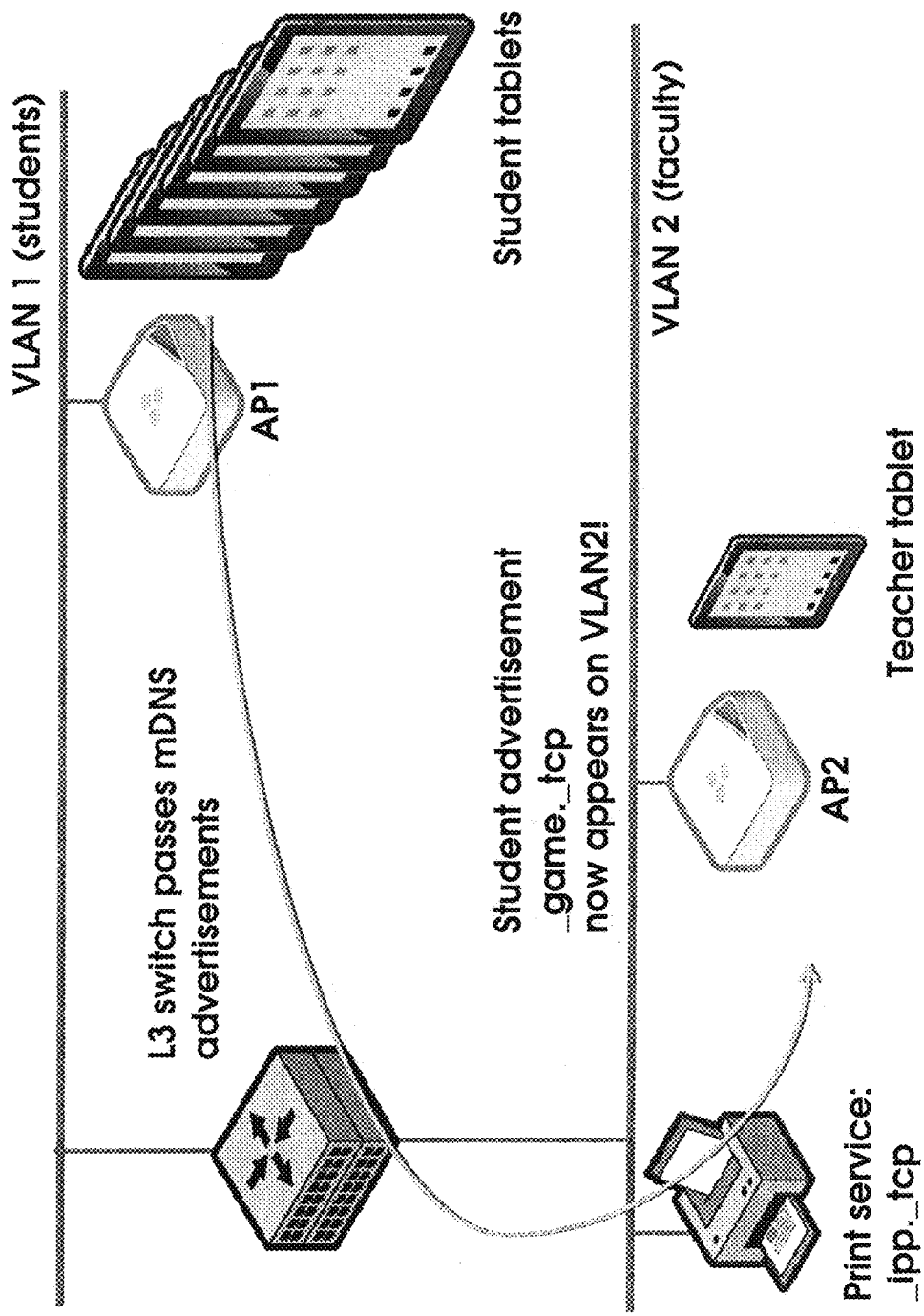
Figure 10:
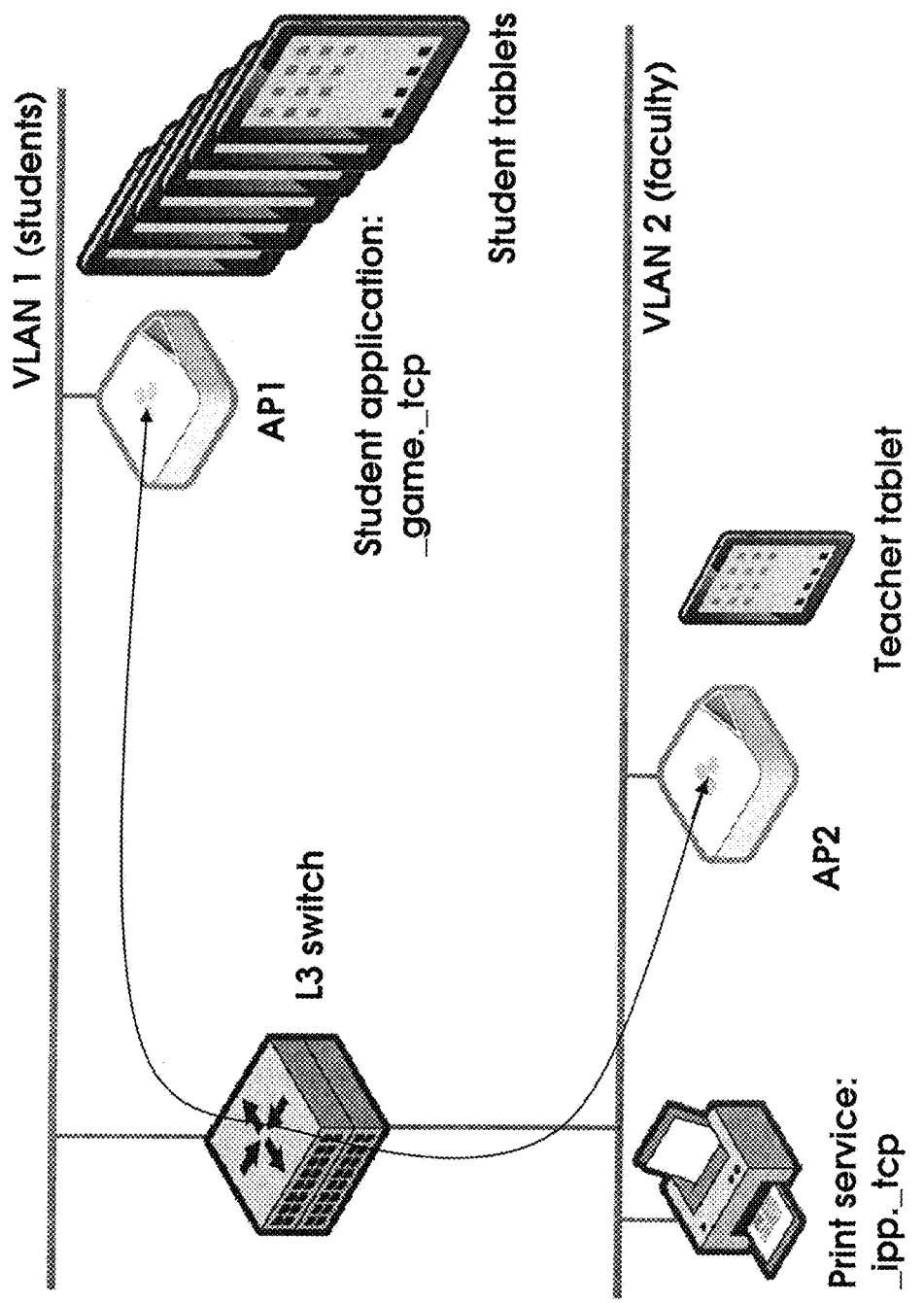
FIG. 10 illustrates application of the present invention to the network topology of FIGS. 1-3.

FIG. 10 is used to illustrate the application of the present invention to the network topology of FIGS. 1-3. AP1 and AP2 may be designated network devices for VLAN 1 and VLAN 2, respectively. AP2 may double as a designated master network device, and AP1 may double as a designated back-up master network device. The process of the present invention may be applied to this network as described above, to provide service advertisement across both VLAN 1 and VLAN 2 without requiring an L3 switch specially adapted for forwarding or duplication of mDNS advertisements. Furthermore, filtering of service advertisements may be readily carried out according to the present invention. For example, the service advertisement from the printer on VLAN 2 is blocked by the L3 switch, but is collected by AP2 and incorporated into a table of services. The table is sent to AP1 so that the printer service may be proxy advertised on VLAN 1 by AP1. Furthermore, the student application _game._tcp which is advertised on VLAN 1 is collected by AP1, and may be filtered so that it is not added to a table of services on VLAN 1 (and thus is not sent to AP2 for proxy advertisement on VLAN 2). As indicated by the double-headed arrow, the communication between AP1 and AP2 controls service advertisement for services beyond the local subnet.

Further refinements to the process described above may include setting advertisement criteria based on proximity to an AP. For example, a service is only proxy advertised if it is within one AP hop in the air for a wireless network or if the service is on a neighboring AP in the air of an AP on a VLAN. This may be implemented on a network with APs which receive or acquire information regarding which APs are neighboring APs.

Yet further refinements to the process described above may include using IP filtering to enable services separately to advertisement of services. To enable IP filtering involves controlling routing and switching. For example, returning to the teacher/student example of FIGS. 1-3, when you configure "allow printing advertisements from teacher VLAN to student VLAN," you would also open up ports in the firewall to allow the printing traffic.

The process for managing service advertisement across a plurality of subnets, as described above may be implemented by software loaded into memory of the various designated devices—the designated devices on each subnet, the master realm designated device and the back-up devices. The software is executed by processors on said designated devices to perform the described process. Although the present invention has been described with the designated devices on both the local and realm level carrying out the processing and storing of data, some of the processing and storing may be in the cloud. For example, the master realm DD and back-up realm DD may be virtual devices in the cloud.

Although the present invention has been particularly described with reference to embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for managing service advertisement across a plurality of subnets comprising:
   collecting, by each of a plurality of designated network devices, service advertisements on a local network level from a corresponding subnet to which said designated network device belongs;
   filtering, by each of the plurality of designated network devices, the service advertisements according to filtering rules of the plurality of subnets to generate one or more filtered listings of services;
   obtaining, by a designated master network device, the one or more filtered listings of services generated by the plurality of designated network devices;
   creating a table of filtered services for said plurality of subnets at said designated master network device using the obtained one or more filtered listings of services;
   sending said table of filtered services for said plurality of subnets from said designated master network device to the plurality of designated network devices in the plurality of subnets;
   creating, by each of the plurality of designated network devices that received the table of filtered services, a service discovery proxy table listing filtered service advertisements on the plurality of subnets other than the corresponding subnet connecting to said designated network device, based on the table of filtered services; and
   transmitting, by each of the plurality of designated network devices that created the service discovery proxy table, the filtered service advertisements listed in said corresponding service discovery proxy table.

2. The method as in claim 1, wherein each subnet with services for which service advertisements are to be transmitted across said plurality of subnets has at least one designated network device.

3. The method as in claim 1, further comprising obtaining, by a designated back-up master network device, the one or more filtered listings of services generated by the plurality of designated network devices.

4. The method as in claim 1, wherein the filtering rules are based on regular expressions.

5. The method as in claim 1, further comprising providing said one or more filtered listings of services to a designated back-up master network device for creating a table of filtered services.

6. The method as in claim 1, wherein said service advertisements on the local network level and the service discovery proxy table created by each of the plurality of designated network devices that received the table of filtered services use multicast DNS (mDNS) protocol.

7. The method as in claim 6, wherein said mDNS protocol is used according to Bonjour protocol.

8. The method as in claim 1, wherein said plurality of subnets are a plurality of VLANs.

9. The method as in claim 1, wherein the plurality of designated network devices are wireless access points.

10. The method as in claim 9, wherein wireless coverage from adjacent wireless access points of said wireless access points is spatially overlapping.

11. The method as in claim 1, wherein said designated master network device is a wireless access point.

12. The method as in claim 1, wherein said designated master network device is a virtual device running on a remote server.

13. The method as in claim 1, further comprising periodically updating said table of filtered services and periodically sending the updated table of filtered services to the plurality of designated network devices that receive the table of filtered services.

14. The method as in claim 13, further comprising updating the service discovery proxy table by each of the plurality of designated network devices that received the table of filtered services.

15. The method of claim 1, wherein the designated master network device is one of the plurality of designated network devices in the plurality of subnets.

16. A method for managing service advertisement across a plurality of subnets comprising:
   collecting, by each of a plurality of designated network devices, service advertisements on a local network level from a corresponding subnet to which said designated network device belongs;
   filtering, by each of the plurality of designated network devices, the service advertisements according to filtering rules of the plurality of subnets to generate one or more filtered listings of services;
   obtaining, by a designated master network device, the one or more filtered listings of services generated by the plurality of designated network devices;
   creating a table of filtered services for said plurality of subnets at said designated master network device using the obtained one or more filtered listings of services;
   receiving said table of filtered services for the plurality of subnets from said designated master network device by each of the plurality of designated network devices in the plurality of subnets;
   creating, by each of the plurality of designated network devices in the plurality of subnets, a service discovery proxy table listing filtered service advertisements on the plurality of subnets other than the corresponding subnet connecting to said designated network device, based on the received table of filtered services; and
   transmitting, by each of the plurality of designated network devices that created the service discovery proxy table, the filtered service advertisements listed in said corresponding service discovery proxy table.

17. The method as in claim 16, wherein each subnet with services for which service advertisements are to be transmitted across said plurality of subnets has at least one designated network device.

18. The method as in claim 16, further comprising obtaining, by a designated back-up master network device, the one or more filtered listings of services generated by the plurality of designated network devices.

19. The method as in claim 16, further comprising providing said one or more filtered listings of services to a designated back-up master network device.

20. A designated network device for managing service advertisement across a plurality of subnets, wherein said designated network device is in a first subnet of said plurality of subnets, said designated network device comprising: a memory device, a computer program being stored in said memory device; and a processor, said computer program causing said processor to perform:
   collecting service advertisements on a local network level;
   filtering the collected service advertisements according to filtering rules of the plurality of subnets to generate a filtered listing of services;
   sending the filtered listing of services to a designated master network device, wherein said designated master network device is elected from a plurality of designated network devices;

receiving a table of filtered services for the plurality of subnets that is generated using the filtered listing of services by the designated master network device from said designated master network device;

creating a service discovery proxy table listing filtered service advertisements on the plurality of subnets other than the first subnet corresponding to said designated network device based on the received table of filtered services; and transmitting the filtered service advertisements listed in the service discovery proxy table on the first subnet corresponding to said designated network device.

21. The network device as in claim 20, wherein each subnet with services for which service advertisements are to be transmitted across said plurality of subnets has at least one designated network device.

22. The network device as in claim 20, wherein said computer program causes said processor to send the filtered listing of services to a designated back-up master network device.

23. The network device as in claim 20, wherein said computer program causes said processor to perform providing said filtered listing of services to a designated back-up master network device for creating a table of filtered services.

24. The network device as in claim 20, wherein said designated network device is a wireless access point.

25. The network device as in claim 20, wherein said service advertisements on the local network level use mDNS protocol and wherein the service discovery proxy table uses mDNS protocol.

26. A system for managing service advertisement across a plurality of subnets, said system comprising:

a designated master network device including a first memory device, a first computer program being stored in said first memory device, and a first processor; and a first designated network device and a second designated network device of a multiplicity of designated network devices, the first designated network device being in a first subnet of the plurality of subnets and the second designated network device being in a second subnet of the plurality of subnets, each of said multiplicity of designated network devices including a second memory device, a second computer program being stored in said second memory device, and a second processor, said second computer program causing said second processor to perform:

collecting service advertisements on a local network level from a corresponding subnet to which said designated network device belongs;

filtering the service advertisements according to filtering rules of the plurality of subnets to generate a filtered listing of services;

sending the filtered listing of services to said designated master network device;

receiving a table of filtered services for the plurality of subnets that is generated using the filtered listings of services by the designated master network device from said designated master network device;

creating a service discovery proxy table listing filtered service advertisements on the plurality of subnets other than the corresponding subnet connecting to said designated network device based on the received table of filtered services; and transmitting the filtered service advertisements listed in the service discovery proxy table on the corresponding subnet connecting to said designated network device.

27. The system as in claim 26, wherein said first computer program causes said first processor to perform:

on receiving the filtered listings of services from said multiplicity of designated network devices, combining the received filtered listings of services to form said table of filtered services; and sending said table of filtered services to said multiplicity of designated network devices on said plurality of subnets.

28. The system as in claim 26, further comprising a designated back-up master network device including a third memory device, a third computer program being stored in said third memory device, and a third processor, wherein said third computer program causes said third processor to perform:

on receiving the filtered listings of services from said multiplicity of designated network devices, combining the received filtered listings of services to form said table of filtered services.

29. The system as in claim 28, wherein the third computer program causes said third processor to further perform, on receipt of a message that said designated master network device is not communicating with at least one of said multiplicity of designated network devices, sending said table of filtered services to said multiplicity of designated network devices on said plurality of subnets.

30. The system as in claim 26, wherein said designated master network device is one of said multiplicity of designated network devices.

* * * * *